(12) United States Patent
Singh et al.

(10) Patent No.: US 11,620,405 B2
(45) Date of Patent: Apr. 4, 2023

(54) AUTOMATED DETECTION, ELIMINATION, AND PREVENTION OF TOXIC COMBINATIONS FOR PERSONAL INFORMATION DATA

(71) Applicant: JPMORGAN CHASE BANK, N.A., New York, NY (US)

(72) Inventors: Jagmohan Singh, Coppell, TX (US); Nagesh Chalasani, Frisco, TX (US); Megan Petrillo, The Colony, TX (US); Reny Mathew, The Colony, TX (US); Ibrahim S. Mkondera, Carrollton, TX (US); Jalpa K. Shah, Irving, TX (US); Matthew Stamy, Frisco, TX (US); Daniel M. Bond, Addison, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 155 days.

(21) Appl. No.: 17/091,622

(22) Filed: Nov. 6, 2020

(65) Prior Publication Data
US 2021/0141928 A1 May 13, 2021

Related U.S. Application Data

(60) Provisional application No. 62/932,638, filed on Nov. 8, 2019.

(51) Int. Cl.
*G06F 21/62* (2013.01)
*G06Q 10/10* (2012.01)
*G06Q 50/26* (2012.01)
*G06F 21/57* (2013.01)
(Continued)

(52) U.S. Cl.
CPC ........ *G06F 21/6245* (2013.01); *G06F 21/563* (2013.01); *G06F 21/57* (2013.01); *G06Q 10/101* (2013.01); *G06Q 10/103* (2013.01); *G06Q 50/265* (2013.01); *G06F 2221/033* (2013.01)

(58) Field of Classification Search
CPC .... G06F 21/6245; G06F 21/563; G06F 21/57; G06F 2221/033; G06F 21/62; G06F 21/56; G06Q 10/101; G06Q 10/103; G06Q 50/265; G06Q 10/10; G06Q 50/26
See application file for complete search history.

(56) References Cited

U.S. PATENT DOCUMENTS

2005/0240999 A1* 10/2005 Rubin ................... G06F 21/563
726/22
2011/0099549 A1* 4/2011 Sriraghavan ......... G06Q 10/109
718/100

(Continued)

*Primary Examiner* — Quazi Farooqui
(74) *Attorney, Agent, or Firm* — Greenblum & Bernstein P.L.C.

(57) ABSTRACT

Exemplary embodiments can identify the toxic PI combinations and flag these combinations for evaluation. Because organization policies on toxic PI combinations can constantly evolve, the system may be continuously updated with the latest policies. Exemplary embodiments may be used as part of an automated code review for application development and for monitoring of existing applications and programs. Thus, exemplary embodiments take the guesswork out of identifying risks in applications and programs by providing an automated tool that can scan and identify toxic combinations in accordance with various policies.

13 Claims, 20 Drawing Sheets

(51) Int. Cl.
    *G06F 21/56*     (2013.01)
    *G06Q 10/101*     (2023.01)

(56) References Cited

U.S. PATENT DOCUMENTS

| | | | |
|---|---|---|---|
| 2013/0333048 A1* | 12/2013 | Coggeshall | H04L 63/12 |
| | | | 726/26 |
| 2016/0099963 A1* | 4/2016 | Mahaffey | G06F 21/554 |
| | | | 726/25 |
| 2019/0246273 A1* | 8/2019 | Zhou | H04W 12/30 |

* cited by examiner

100

Toxicity Busters

102

Toxicity Busters   Home   Admin

Toxicity Busters

106  110
Seal ID     Risk Classification   Application Owner
105978      Confidential           John Doe       [Scan]
12345       Confidential           John Doe       [Scan]

104                                           114
                                                  112

Scan History

| SCAN ID ↕ | SEAL ID ↕ | SCAN DATE ↕ | SCAN RESULT ↕ | MESSAGE ↕ | RISK LEVEL ↕ |
|---|---|---|---|---|---|
| 1 | 106978 | 2019-06-26 20:44:54 | Pass | Account Number Name and Address is considered a Toxic Combo | Confidential |
| 2 | 106078 | 2019-06-26 19:44:54 | Fail | Account Number Name and Address is considered a Toxic Combo | Highly Confidential |
| 3 | 12345  | 2019-06-26 14:44:54 | Fail | Account Number Name and Address is considered a Toxic Combo | Highly Confidential |
| 6 | 106078 | 2019-06-26 19:44:54 | Fail | Account Number Name and Address is considered a Toxic Combo | Highly Confidential |
| 7 | 12345  | 2019-06-26 14:44:54 | Fail | SSN and Address is considered a Toxic Combo | Highly Confidential |
| 8 | 106978 | 2019-06-26 10:44:54 | Pass |  | Public |

108

1 to 6 of 6                                         [First] [Prev...] Page 1 of 1 [Next] [Last]

Toxicity Busters

| | Seal ID | Risk Classification | Application Owner | |
|---|---|---|---|---|
| | 105978 | Confidential | John Doe | Scan |
| | 12345 | Confidential | John Doe | Scan |

210

Scan Results ✕

We analyzed the database, it looks like your risk level in seal matches the calculated risk level. Please proceed with deployment.

Expected Risk Level: CONFIDENTIAL
Actual Risk Level: CONFIDENTIAL
Scan Status: pass
Message: No Toxic Combinations or risk level violations detected

[Close Results]

| SCAN ID ⇵ | SEAL ID ⇵ | SCAN DATE ⇵ | E ⇵ | | RISK LEVEL ⇵ |
|---|---|---|---|---|---|
| 1 | 105978 | 2019-06-26 20:44:54 | | is considered a Toxic Combo | Confidential |
| 2 | 105978 | 2019-06-26 19:44:54 | | is considered a Toxic Combo | Highly Confidential |
| 3 | 12345 | 2019-06-26 14:44:54 | | is considered a Toxic Combo | Highly Confidential |
| 6 | 105978 | 2019-06-26 19:44:54 | | is considered a Toxic Combo | Highly Confidential |
| 7 | 12345 | 2019-06-26 14:44:54 | | dered a Toxic Combo | Highly Confidential |
| 8 | 105978 | 2019-06-26 10:44:54 | | | Public |

1 to 6 of 6

[First] [Prev...] Page 1 of 1 [Next] [Last]

Toxic Combination Regular Expression Rule

300

```
rule "Check if Toxic combo exist"
    dialect "java"
    salience 1000
    no-loop true
    lock-on-active true
when
    columnList : ArrayList(size > 1) from collect( Column (COLUMN_COMMENT matches "(.*)Address(.*)" || COLUMN_NAME matches
    "(.*)ADDR(.*)" || COLUMN_COMMENT matches "(.*)account(.*)" || COLUMN_NAME matches "(.*)ACCT(.*)" ) )
    res : RuleResults()
        resList :RuleResultList()
then
    for ( Object col:columnList) {|
        Column c = (Column) col;
        res = new RuleResults();
        res.setColumn(c);
        res.setConfidentiality(RiskLevelEnum.TOXIC_COMBO);
        resList.getResultList(). add(res);
    }
    update(resList);
end
```

Public Information Regular Expression Rule

```
rule "Check If database has Public Data"
    salience 100
    dialect "java"
    no-loop true
    lock-on-active true
    when
        column : Column(COLUMN_NAME matches "(.*)NM(.*)" || COLUMN_NAME matches "(.*)ADDR(.*)" ||
        COLUMN_NAME matches "(.*)CONTACT(.*)");
        res : RuleResults()
        resList :RuleResultList()
    then
        res = new RuleResults();
        res.setColumn(column);
        resList.getResultList() .add(res);
        update(res);
        update(resList);
        System.out.println(drools.getRule() .getName());
    end
```

FIG. 3B

Highly Confidential Information Regular Expression Rule  310

```
rule "Check If database has Highly Confidential Data"
    salience 1000
    dialect "java"
    no-loop true
    lock-on-active true
    when
        column : Column(COLUMN_NAME matches "(.*)ssn(.*)" || COLUMN_NAME matches "(.*)SSN(.*)" ||
        COLUMN_COMMENT matches "(.*)ssn(.*)" || COLUMN_COMMENT matches "(.*)SSN(.*)");
        res : RuleResults()
        resList :RuleResultList()
    then
        res = new RuleResults();
        res.setColumn(column);
        res.setConfidentiality(RiskLevelEnum.HIGHLY_CONFIDENTIAL);
        resList.getResultList().add(res);
        update(res);
        update(resList);
        System.out.println(drools.getRule().getName());
    end
```

FIG. 3C

APPLICATION DASHBOARD

We recommend all application components are integrated with any of the supported Continuous Integration deployment tools to detect and eliminate toxic combinations as early as possible. Trigger a manual scan for an application component or review reports from the most recent scan.

DATA STORE

Classification: Highly Confidential
Last Scan Date: July 21, 2019
Last Scan Result: Success

[Scan] [Report Details]

DISTRIBUTED DATA STORE

Classification: Confidential
Last Scan Date: August 20, 2019
Last Scan Result: Action Required

[Scan] [Provide Details]

RESTSERVICE

Classification: Highly Confidential
Last Scan Date: May 15, 2019
Last Scan Result: Failure

[Scan] [Report Details]

FIG. 5A

DATA STORE REPORT DETAILS

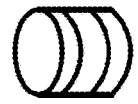

Recognized Elements: 89
Unrecognized Elements: 0
Rules Executed: 183
Rules Failed: 0

RULES ENGINE RESULTS — 522

| Rule ID | Rule Description | Classification | Rules Engine Result | Rules Engine Message |
|---|---|---|---|---|
| R49 | Unmasked Personal Information | Critical | Pass | PI Data is masked |
| R50 | Unmasked Highly Confidential Data | Critical | Pass | Highly Confidential data is masked |
| R51 | Customer Full Name + Address | Toxic Combination | Pass | Combination is not present in data store |
| R52 | First Name + Last Name | Highly Confidential | Pass | Elements are not present |
| R53 | Full Name + Mailing Address | Highly Confidential | Pass | Elements are not present |
| R54 | First Name + Social Security Number | Toxic Combination | Pass | Elements are not present |
| R55 | Last Name + Social Security Number | Toxic Combination | Pass | Elements are not present |
| R56 | Unrecognizable Elements | Action Required | Pass | Elements were recognized by the engine |
| R57 | Personal information elements greater than 2% | Critical | Pass | PI elements below threshold |

FIG. 5C

AUTOMATED DETECTION, ELIMINATION, AND PREVENTION OF TOXIC COMBINATIONS FOR PERSONAL INFORMATION DATA

CROSS-REFERENCE TO RELATED APPLICATIONS

This application claims priority to U.S. Provisional Application No. 62/932,638, filed on Nov. 8, 2019, the contents of which are incorporated by reference in their entirety.

FIELD OF THE INVENTION

Exemplary embodiments generally relate to a system and method that provides for the automated identification and re-classification of toxic personal information (PI) combinations.

BACKGROUND

Personal information (PI) covers a variety of information. Certain PI is public, such as a person's name. Certain PI is confidential, such as an account number or access code. However, when certain PI is put together, it becomes highly confidential, such as a name and account number. This is what is known as a toxic combination. Typically, awareness of such toxic combinations is lacking.

Many organizations have policies on toxic combinations and how such are to be handled. These policies are based upon various laws and regulations including the Gramm Leach Bliley Act and the E. U. General Data Protection Regulation.

But organization policies constantly change and employees are not able to keep up with the changes. Thus, many applications and programs do not follow organization guidance on toxic combinations and unknowingly expose PI to the public though these toxic combinations. This occurs even though, as part of application development, code reviews are done (typically, manually) to ensure the application code is compliant with organization policies.

These and other drawbacks exist.

SUMMARY OF EXEMPLARY EMBODIMENTS

An exemplary embodiment includes a system having a server comprising at least one computer processor configured with one or more rulesets, the one or more ruleset being configured to identify toxic combinations of personal information in at least one of a database and computer code; the server further having a user interface configured to provide actuation of a scan of the database and computer code and to display results of the scan; wherein the one or more rulesets are updated periodically.

Another exemplary embodiment includes a system having a server comprising at least one computer processor configured with one or more rulesets, the one or more ruleset being configured to identify toxic combinations of personal information in at least one of a database and computer code; the server further being configured to automatically execute scans of databases and computer code resident on a network and display the results; wherein the one or more rulesets are updated periodically.

Another exemplary embodiment includes a method having steps of receiving a login request for a scan tool via a computer network, wherein the scan tool is configured with one or more rulesets that are configured to identify toxic combinations of personal information in at least one of a database and computer code; providing access to the scan tool upon verification of the login request; present a user interface; receiving a selection, through user interface, of an application to be scanned; performing a scan of the application; presenting results of the scan through the user interface.

These and other advantages will be described more fully in the following detailed description.

BRIEF DESCRIPTION OF THE DRAWINGS

In order to facilitate a fuller understanding of the present invention, reference is made to the attached drawings. The drawings should not be construed as limiting the present invention, but are intended only to illustrate different aspects and embodiments of the invention.

FIG. 1 depicts an application home page according to exemplary embodiments.

FIG. 2A depicts a scan results page according to exemplary embodiments.

FIG. 2B depicts a second scan results page according to exemplary embodiments.

FIGS. 3A, 3B, and 3C depict sample rulesets for a rule engine according to exemplary embodiments.

FIG. 5A depicts an application dashboard according to exemplary embodiments.

FIG. 5C depicts details of a detail store report according to exemplary embodiments.

DETAILED DESCRIPTION

Figure 4A:
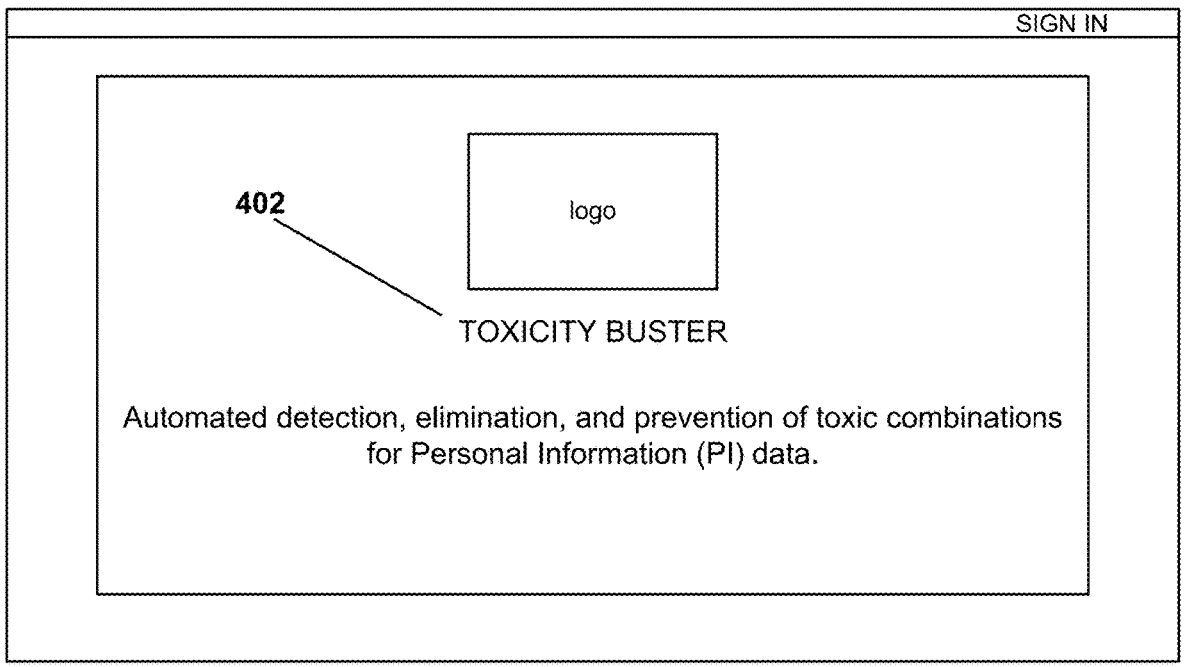
FIG. 4A depicts a landing page according to exemplary embodiments.

The following description is intended to convey an understanding of exemplary embodiments by providing specific embodiments and details. It is understood, however, that various embodiments are not limited to these specific embodiments and details, which are exemplary only. It is further understood that one possessing ordinary skill in the art, in light of known systems and methods, would appreciate the use of various embodiments for its intended purposes and benefits in any number of alternative embodiments, depending upon specific design and other needs.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the various embodiments. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Exemplary embodiments provide a system and method that automatically evaluates applications for compliance with organization policies regarding PI. Exemplary embodiments may include a tool for scanning application code in both development and deployment phases. The tool may include a user interface, a scanner, and a rules engine. The rules engine may include rulesets to identify PI and toxic combinations in accordance with organization policies. The scanner may support both manual and automatic scans. According to exemplary embodiments, the tool may identify the toxic combinations and provide notification to application owners through the user interface as well as through email and other electronic notifications. For purposes of this application, an organization may be any entity, such as, but not limited to, a corporation, a financial institution, a start-up, or a small business.

PI, or even information in general, may be classified by an organization at varying levels. These levels may be determined by the organization and may be based on various laws and regulations governing PI. For example, PI may be classified as public, internal, confidential, and highly confidential. Other designations are possible. When certain types of PI are combined, the classification of that information may increase, even though the individual parts of the combination may be public by themselves. These combinations may be referred to as toxic combinations. Combinations that result in confidential or highly confidential PI may be toxic combinations.

By way of exemplary, non-limiting examples, the following information, by itself, may be classified as public: corporation name, email address, intellectual property, personal photograph, physical address, telephone number. This information is only public if it is disseminated outside of the organization; otherwise, it may fall into the internal category. By way of exemplary, non-limiting examples, the following information, by itself, may be classified as internal information: country of workplace, internal email address, first/given/family name or nicknames, employee ID number, IP address, organizational charts, firm policies, internal telephone number. By way of exemplary, non-limiting examples, the following information, by itself, may be classified as confidential information: account number, age, balance sheets, disaster recovery plan, client information, customer transaction information, credit scores, credit card numbers as well as CVV and CVC codes, date of birth, benefit information for individuals, employment history, geolocation data, income and earning information, audit reports, marital status, mother maiden name, signature, tax ID, trade information. By way of exemplary, non-limiting examples, the following information, by itself, may be classified as highly confidential information: authentication credentials, biometric information, check images, credit bureau report, criminal record, medical information, sensitive personal information, government identification number.

Certain information like name, photographs, address, telephone number, employee number, age, etc. (i.e., personal identifying information) may be classified as PI.

Certain information may be designated as a direct identifier that, when combined with other information may result in an elevated classification level. For example, an email address combined with credit card information will be classified as highly confidential. This is a potential toxic PI combination.

Exemplary embodiments can identify the toxic PI combinations and flag then for evaluation. Further, exemplary embodiments can identify improperly designated PI and other information. Because organization policies on toxic PI combinations can constantly evolve, the system may be continuously updated with the latest policies. Exemplary embodiments may include a tool or application or system may be used as part of an automated code review for application development and for monitoring of existing applications and programs. For example, the tool according to exemplary embodiments may automatically run at various points in the code development process to scan the code and identify if an toxic PI combinations exist. If such combinations exist, the system may flag these combinations and provide appropriate notifications. These combinations may then be addressed and fixed in the code. In other words, the system may act as a gatekeeper to block code going to production that is not compliant with organization policies.

In other embodiments, the tool may be configured to run at various intervals to scan existing applications that are in service internally or in a customer-facing configuration. These scans may identify any toxic PI combinations and flag the application so it may be taken offline for update/correction. The tool may notify the appropriate application owner or data owner of the issue. Exemplary embodiments may be constantly updated with the latest organization policies regarding PI and toxic combinations. Scans may be automatically run following each update to the system. Thus, exemplary embodiments take the guesswork out of identifying risks in applications and programs by providing an automated tool that can scan and identify toxic combinations in accordance with various policies.

Code review for applications can be automated. It may be a similar to a virus scan. The automated scan may be conducted before code goes to production or at periodic intervals while the application is being used. If a problem in the code is found, it may be flagged and must be addressed before the code goes to production or is used further. Exemplary embodiments may run in the background.

For example, the tool according to exemplary embodiments may run on an application or code. During the run, exemplary embodiments may scan for compliance with policies on PI, including looking for toxic PI combinations or potential toxic PI combinations. If any such combinations are identified, exemplary embodiments may flag those combinations and identify the offending code or portion of the application. Upon this identification, the owner or developer of the application or code may fix the identified problem. In various embodiments, if a problem is identified, the application may be pulled from use until the problem is resolved.

Exemplary embodiments may be platform/infrastructure agnostic and can be hosted in a public, private or hybrid cloud as well as physical infrastructure. The "Toxic Combo Scan" service(s) of exemplary embodiments as described herein can be invoked via a user interface or web service call.

FIG. 1 depicts an application home page 100 according to exemplary embodiments. This application home page may allow access to the tool according to exemplary embodiments. On the home page, a set of applications ready to scan are depicted at 102 and a scan history is shown at 104. The scan history 104 may display a variety of information in different fields. For example, according to exemplary embodiments, as depicted in FIG. 1, the scan history 104 may have the following fields: scan ID #106, scan date 108, scan result 110, message 112, and risk level 114. In various embodiments, these fields may be customizable. For example, the fields may be reordered, sorted, changed, and/or additional fields added. This page may be depicted upon logging into the application. Scans can be manually initiated from this page. Note that the name "Toxicity Busters" and the other names shown on the home page 100 are meant to be non-limiting. It should be appreciated that the application may have other names.

Figure 2A:
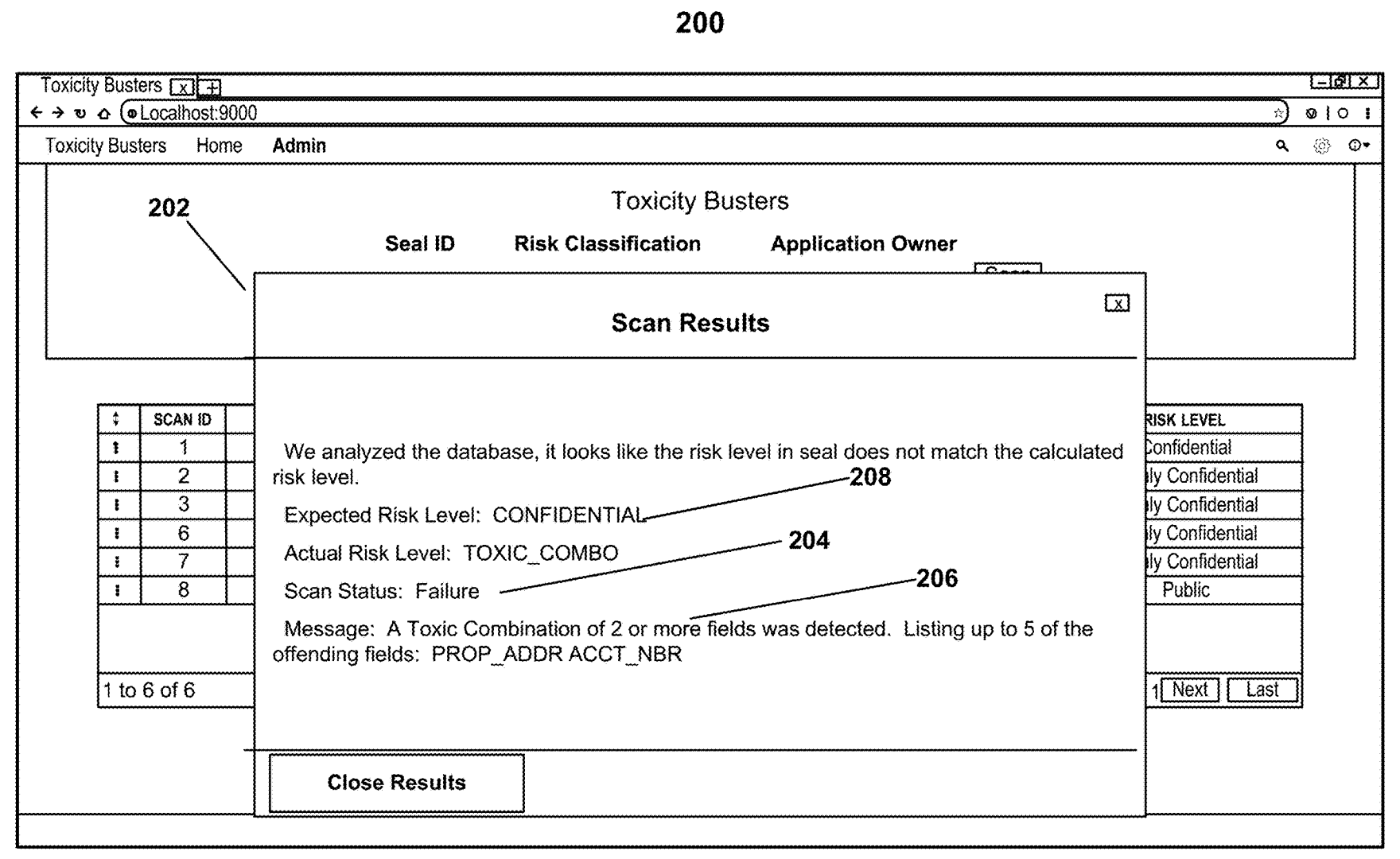

FIG. 2A depicts a scan results page 200 according to exemplary embodiments. The scan results 202 depicted are a failure (204) because the scanner detected a toxic combination based on the database catalog. The scanner identifies the fields (206) where the toxic combination was present. The scan results show that the expect level of classification was "confidential" (208). Based on the result, the actual classification is "critical." The scan results 202 may be displayed as a pop-up window over the home page 100 from FIG. 1. The scan results page 200 may be a detailed view of one of the scan history 104 entries depicted in FIG. 1. The scan results page 200 may be brought forth by selecting an entry in the scan history 104. For example, an entry in the scan history 104 may be double clicked.

FIG. 2B depicts a second scan results page 250 according to another exemplary embodiment. The scan results 210 depicted show no toxic combinations were found (212). The scan results page 250 may be brought forth from the scan history 104 in a similar manner to the scan results page 200 described above with respect to FIG. 2A.

FIGS. 3A, 3B, and 3C depict example rule sets 300, 305, and 310 according to exemplary embodiments. The rule sets may be implemented in exemplary embodiments in a rule engine. Note that the depicted rule sets in FIGS. 3A, 3B, and 3C are meant to be exemplary and non-limiting. According to exemplary embodiments, the rules may be written in jBoss drools. Alternatively, the rules may be written in IBM ilog or another suitable language.

FIG. 3A depicts a rule set with a rule name of "Check if Toxic Combo exist." The rule is structured as follows: when more than one column name or description (in the schema) in a single table contains a qualifying identifier, such as Address, ADDR, Account, or ACCT (not limited to only these combos), then the table's confidentiality should be considered as a toxic combination which is what the rule returns in the code.

FIG. 3B depicts a rule set with a rule name of "Check If database has Public Data." The rule is structured as follows: when a table contains columns with names or descriptions with qualifying identifiers such as NM or ADDR or CONTACT, then the column is considered as public information and there is no confidentiality associated with it.

FIG. 3C depicts a rule set with a rule name of "Check If database has Highly Confidential Data." The rule is structured as follows: when a table contains columns with names or descriptions that have qualifying identifiers such as ssn or SSN, then the table's confidentiality should be considered as Highly Confidential.

FIG. 4A depicts a landing page 400 according to exemplary embodiments. This page may be displayed to a user when the user initially accesses the application and is not signed in. This page may be an alternative to the home page of FIG. 1. Note that the application name "Toxicity Buster" shown in FIG. 4A at 402 is meant to be non-limiting. It should be appreciated that the application may have other names.

Figure 4B:
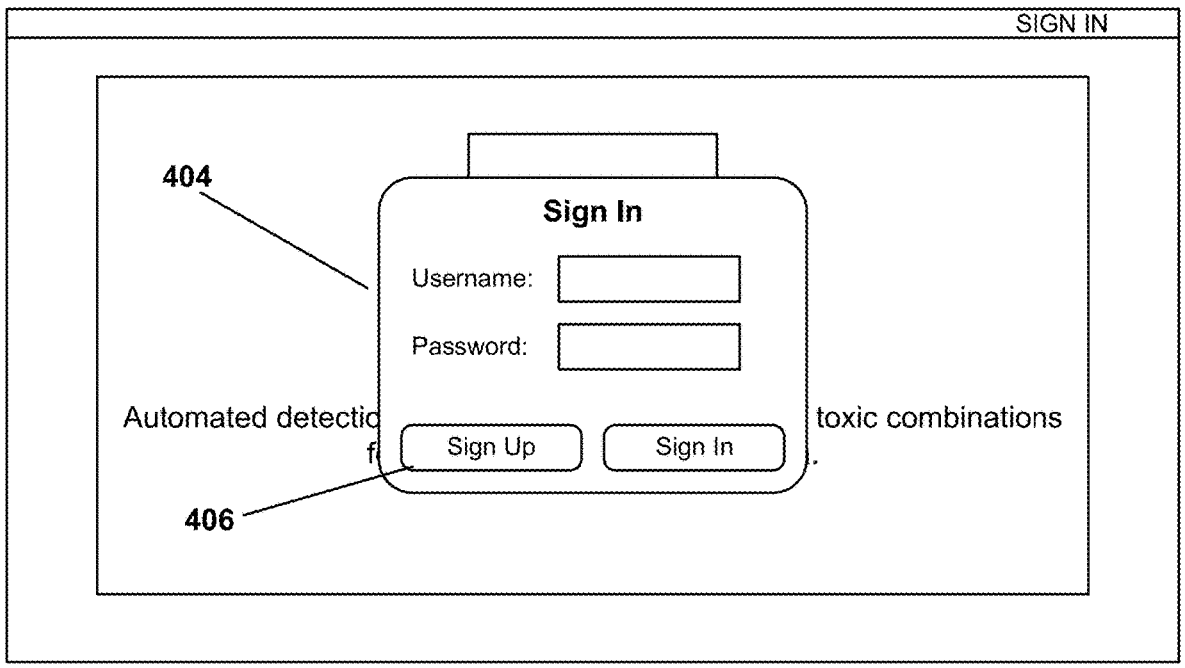
FIG. 4B depicts a login page according to exemplary embodiments.

FIG. 4B depicts a login page 450 according to exemplary embodiments. The login page may have a sign in window 404 that allows a user to enter a username and password. The sign in window 402 may have a sign up button 406 for a user that is not registered.

FIG. 5A depicts an application dashboard 500 according to exemplary embodiments. This application dashboard may be an alternative display to that depicted in FIG. 1. This application dashboard page may be displayed following a successful login to the application. After signing in to the application, all components that are registered to an application user may appear on the dashboard. For example, the dashboard may display a data store component 502, a distributed data store component 504, and a Representational State Transfer (REST) service component 506. The components displayed are exemplary and non-limiting. The application dashboard 500 may have a header portion with a message 508. Note that the message displayed at 508 is exemplary and non-limiting.

The user may have the ability to manually trigger the scan or view the latest report from a previous scan. In certain embodiments, the rules engine may not be able to determine the classification for a particular element.

In the application dashboard 500, the data store component 502 displays a successful previous scan. The distributed data store component 504 displays a scan where a component where elements were not recognized. The REST service component 506 displays a failed previous scan, indicating the current risk classification does not match the actual risk classification. As depicted in FIG. 5A on application dashboard 500 for each component displayed, the user may have the option to initiate a new scan 512 and/or request report details 514 (using component 502 as an example).

Figure 5B:
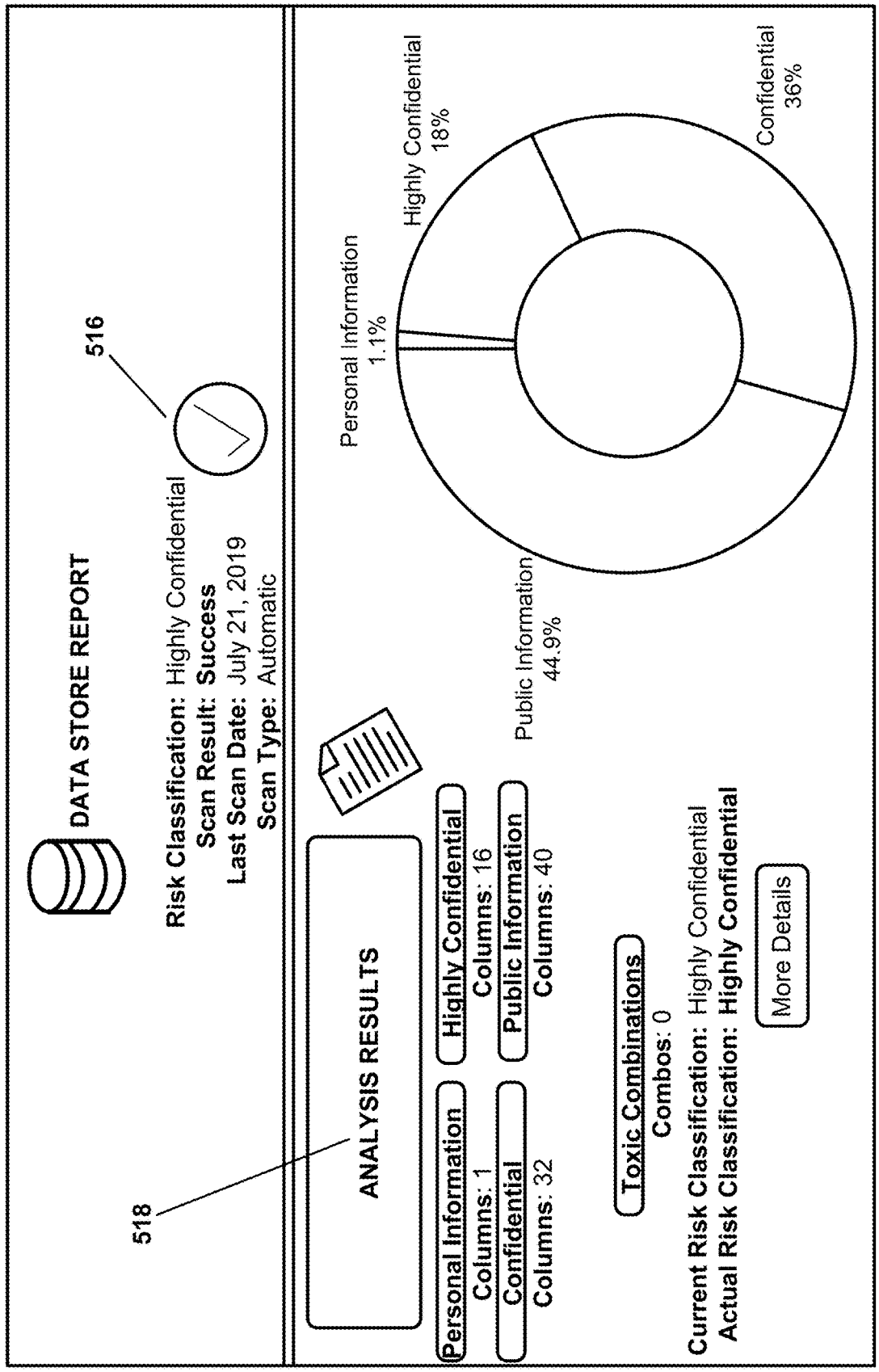
FIG. 5B depicts a data store report according to exemplary embodiments.

FIG. 5B depicts a data store report 510 according to exemplary embodiments. This data store report may be accessed through the application dashboard. This report depicts what a successful scan may look like (516) and provide the analysis results 518. According to exemplary embodiments, a successful scan may be when the rules engine calculates the same risk classification that the component or application is actually registered as or should be. The analysis results 518 may provide different information to the user. The format and information depicted is exemplary and non-limiting.

FIG. 5C depicts details of a data store report 520 according to exemplary embodiments. This page may be accessed through FIG. 5B. This page may depict the rules that were executed and any corresponding messages (522). The rules and messages depicted are exemplary and non-limiting.

Figure 5D:
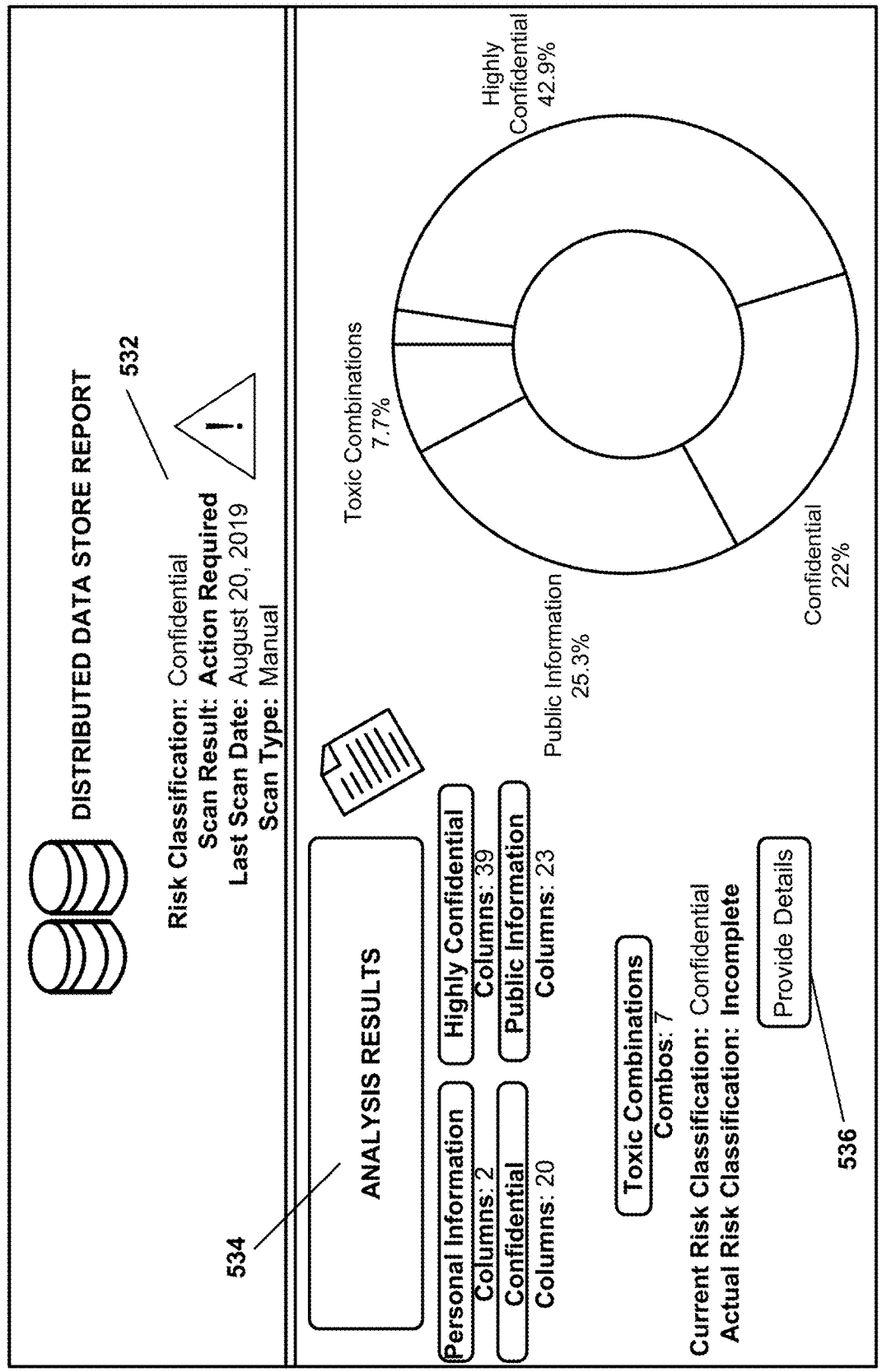
FIG. 5D depicts a distributed data store report according to exemplary embodiments.

FIG. 5D depicts a distributed data store report 530 according to exemplary embodiments. This page may be accessed through FIG. 5A. This report shows a scan that is incomplete (532). That is, more information may be required to calculate an accurate risk classification. In the analysis results 534, the user may be prompted to click the "provide details" button (536) to supply to required information to complete the scan.

Figure 5E:
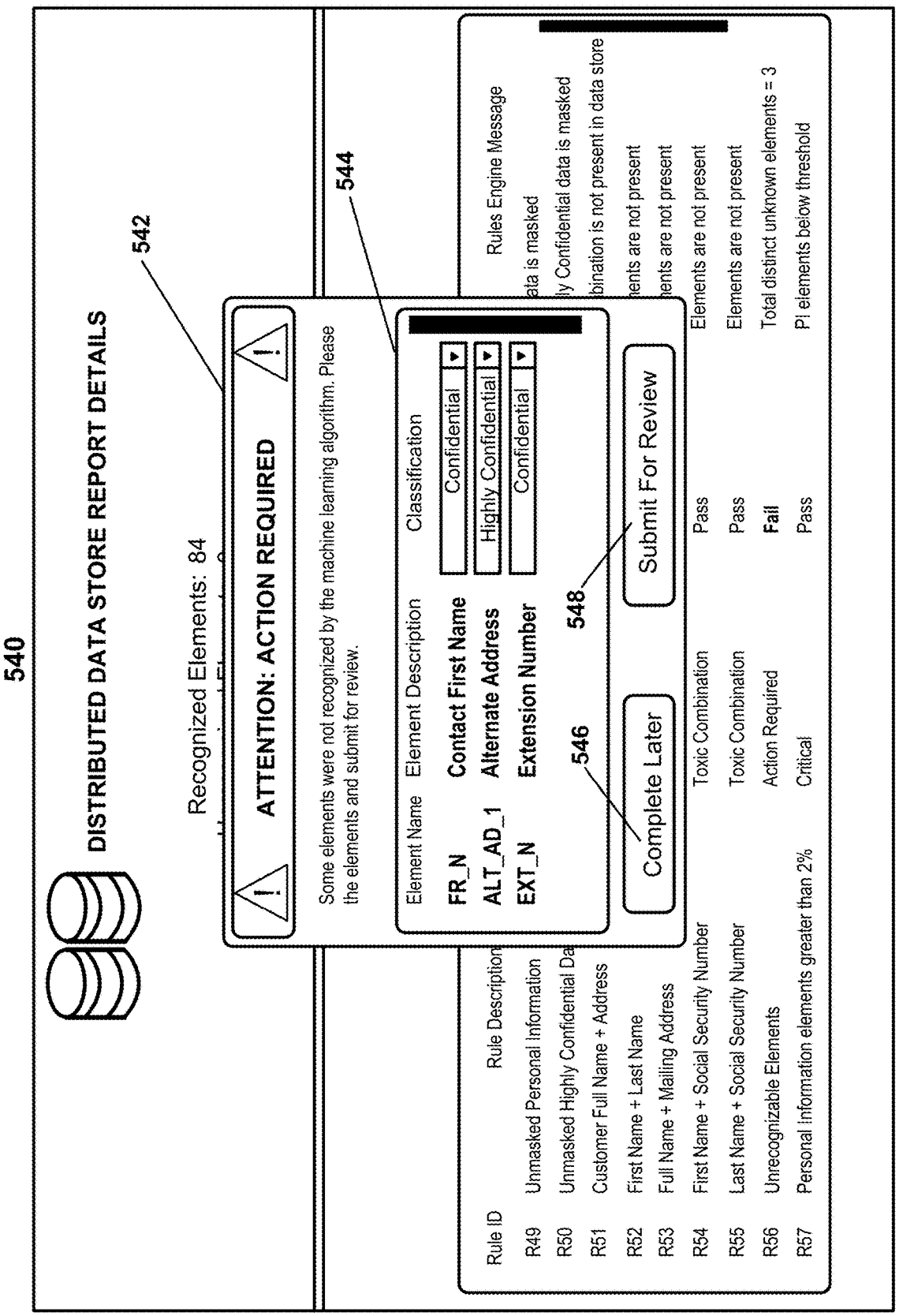
FIG. 5E depicts details of a distributed data store report according to exemplary embodiments.

FIG. 5E depicts details of a distributed data store report 540 according to exemplary embodiments. Once the user clicks the button as described in FIG. 5D at 536, a pop-up window 542 may appear. This window may provide a listing of elements (544) that require classification. Options to either "complete later" (546) and "submit for review" (548) may be provided. Once submitted, a further review may be conducted by a user with higher privileges or a supervisor or manager.

Figure 5F:
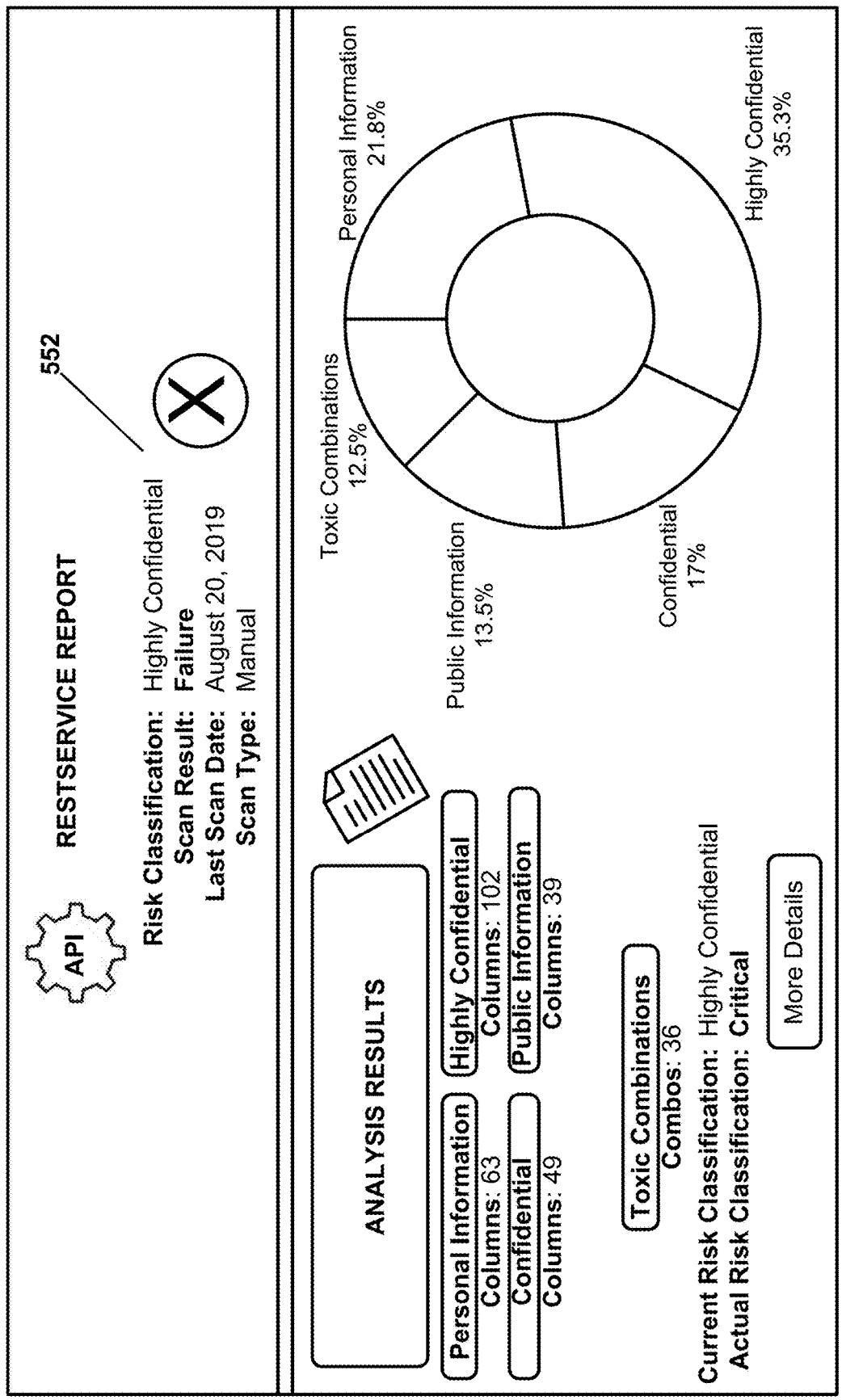
FIG. 5F depicts a REST service report according to exemplary embodiments.

FIG. 5F depicts a REST service report 550 according to exemplary embodiments. This report may be what a failed scan looks like (552). A failure, according to exemplary embodiments, may be when the rules engine calculates a risk classification that is different from the risk classification that the application component is registered as or expected to be.

Figure 6:
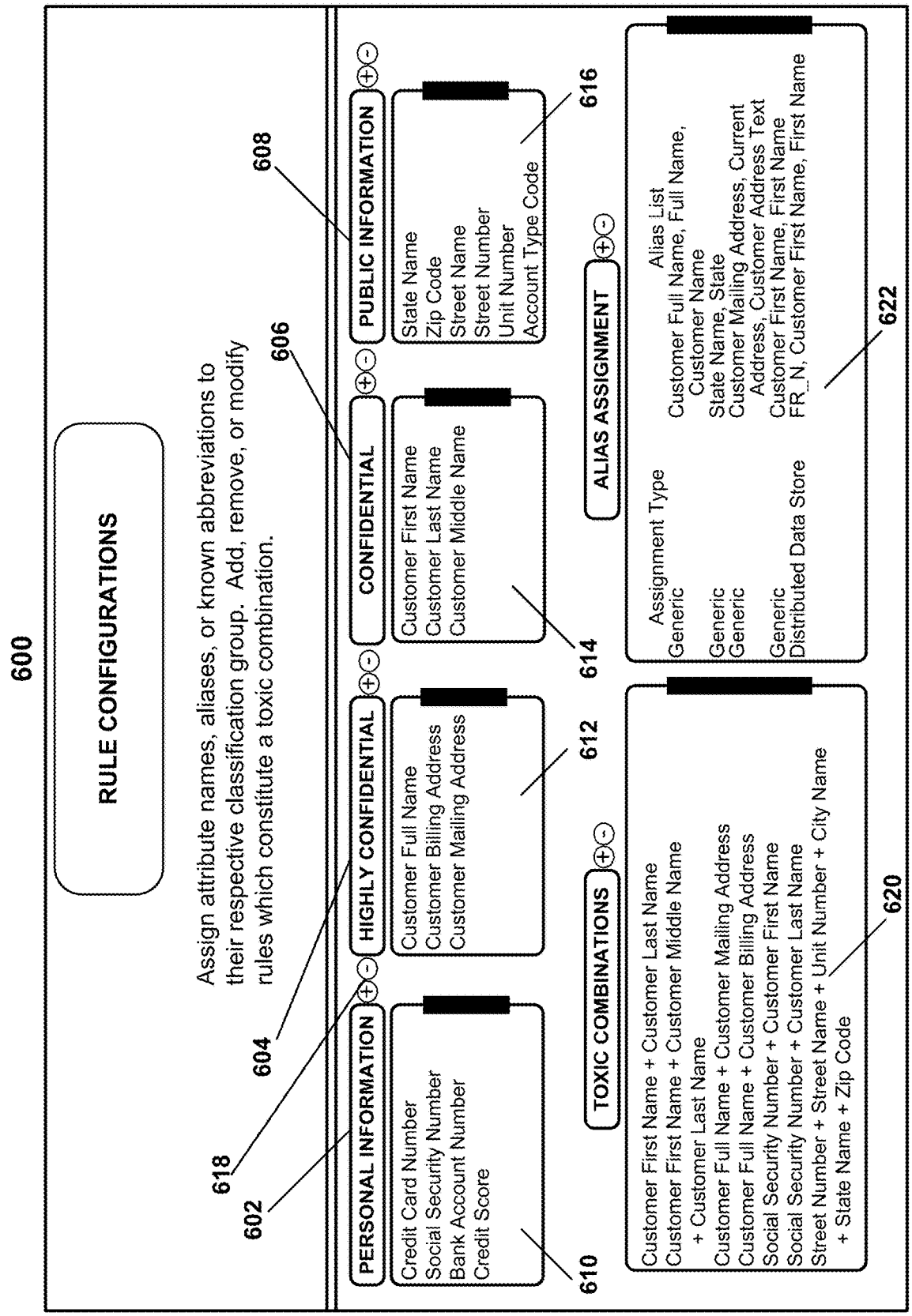
FIG. 6 depicts a rule configurations page according to exemplary embodiments.

FIG. 6 depicts a rule configuration page 600 according to exemplary embodiments. This page gives a user, such as an administrator, the ability to assign an element to a classification level, as well as remove an element from a classification level. For example, as shown at blocks 602, 604, 606, and 608, there may be classification levels of personal information, highly confidential, confidential, and public information. Below each classification heading are blocks 610, 612, 614, and 616 which contain various exemplary elements. The user may drag and drop elements between the blocks as well as delete elements. A plus/minus selection 618 may be provide to select elements to add or subtract to each block. Actuating the plus or minus selection 618 may bring up a pop-up window containing a listing of elements to select from to add or subtract from the classification block.

The user may add or remove toxic combinations (620) and assign an alias (622) to an already classified element. The alias assignment can apply to all application components or to an specific application component so that the engine recognizes an unusually named element when scanning the application component, but only allows this for a particular component.

Figure 7:
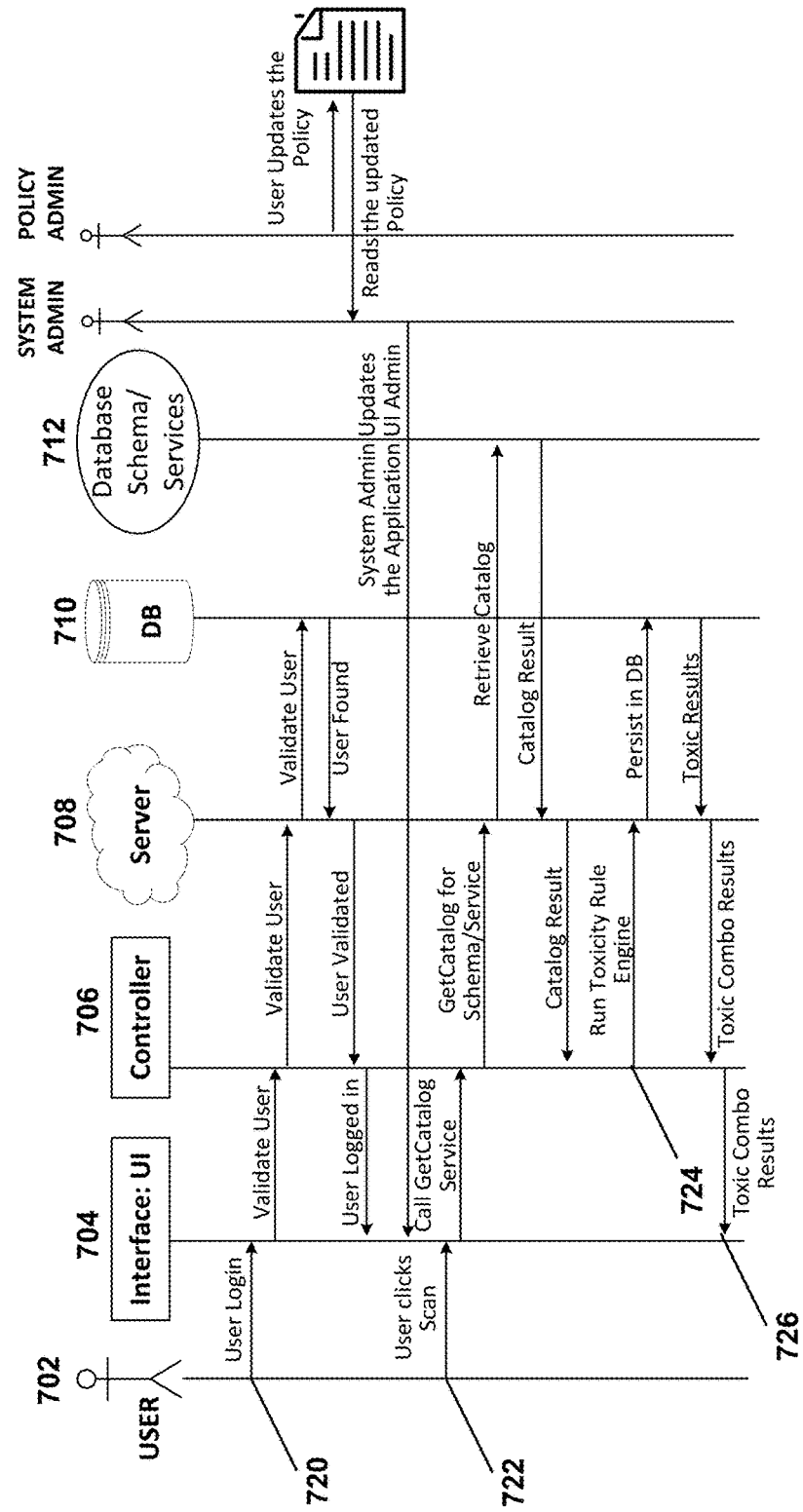
FIG. 7 depicts a sequence flow for a manual scan according to exemplary embodiments.

FIG. 7 depicts a sequence flow 700 for a manual scan according to exemplary embodiments. The sequence flow 700 shows the flow of events between a user 702, interface UI 704, controller 706, server 708, database (DB) 710, database schema/service 712, system admin 714, and policy admin 716. The sequence flow 700 commences with the user log in sequence that begins at 720. After validation of the user, the user clicks a scan and commences the sequence at 722. The scan initiation leads to the toxicity engine being run at 724 and the ultimate result is the return of toxic combo results at 726.

Figure 8A:
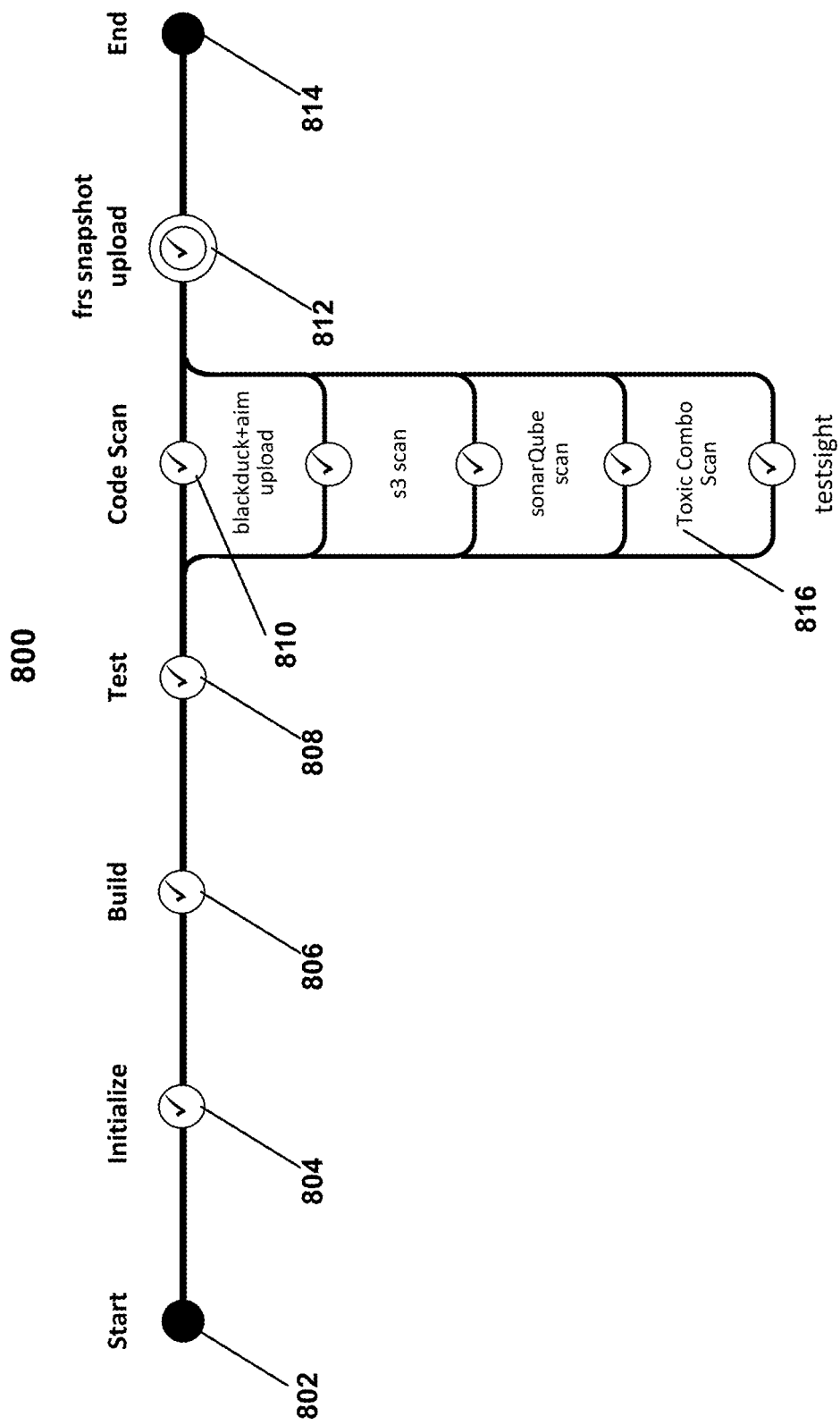
FIG. 8A depicts a CI/CD pipeline for an automatic scan according to exemplary embodiments.

FIG. 8A depicts an exemplary continuous integration and continuous delivery (CI/CD) pipeline 800 for an automatic scan according to exemplary embodiments. The toxic combo scan according to exemplary embodiments may be a part of the code scan pipeline. The code scan pipeline actions are exemplary and meant to be non-limiting. Applications listed in these actions are meant to be exemplary and non-limiting. The pipeline 800 may include a start 802, initialization 804, build, 806, test 808, a code scan 810, a frs snapshot upload 812, and end 814. The code scan 810 may have a series of sub-steps as depicted including a Toxic Combo Scan 816, which includes exemplary embodiments as described herein. FIG. 8 demonstrates how the Toxic Combo Scan 816 can be incorporated into an exemplary pipeline 800, regardless of CI/CD platform.

Figure 8B:
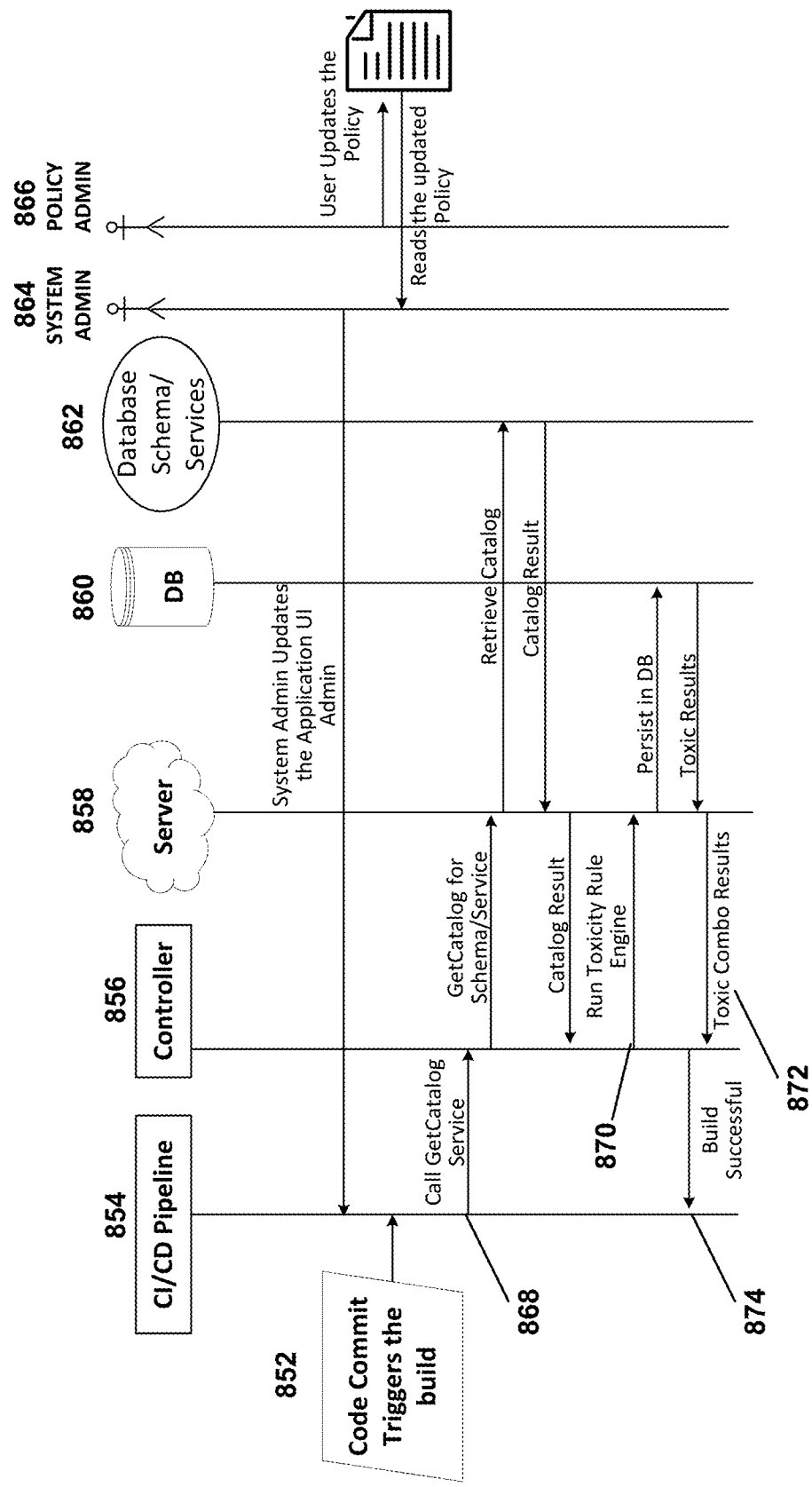
FIG. 8B depicts a sequence flow for an automatic scan according to exemplary embodiments.

FIG. 8B depicts a sequence flow 850 for an automatic scan according to exemplary embodiments. The sequence flow 850 shows the flow of events between a code commit triggering the build at 852, CI/CD pipeline 854, controller 856, server 858, database (DB) 860, database schema/service 862, system admin 864, and policy admin 866. The sequence flow 850 begins with the code commit at 852, which triggers the call getcatalog service at 868, beginning the sequence flow depicted. The toxicity rule engine is run at 870 and returns toxic combo results at 872, resulting in build successful indication at 874.

Figure 9:
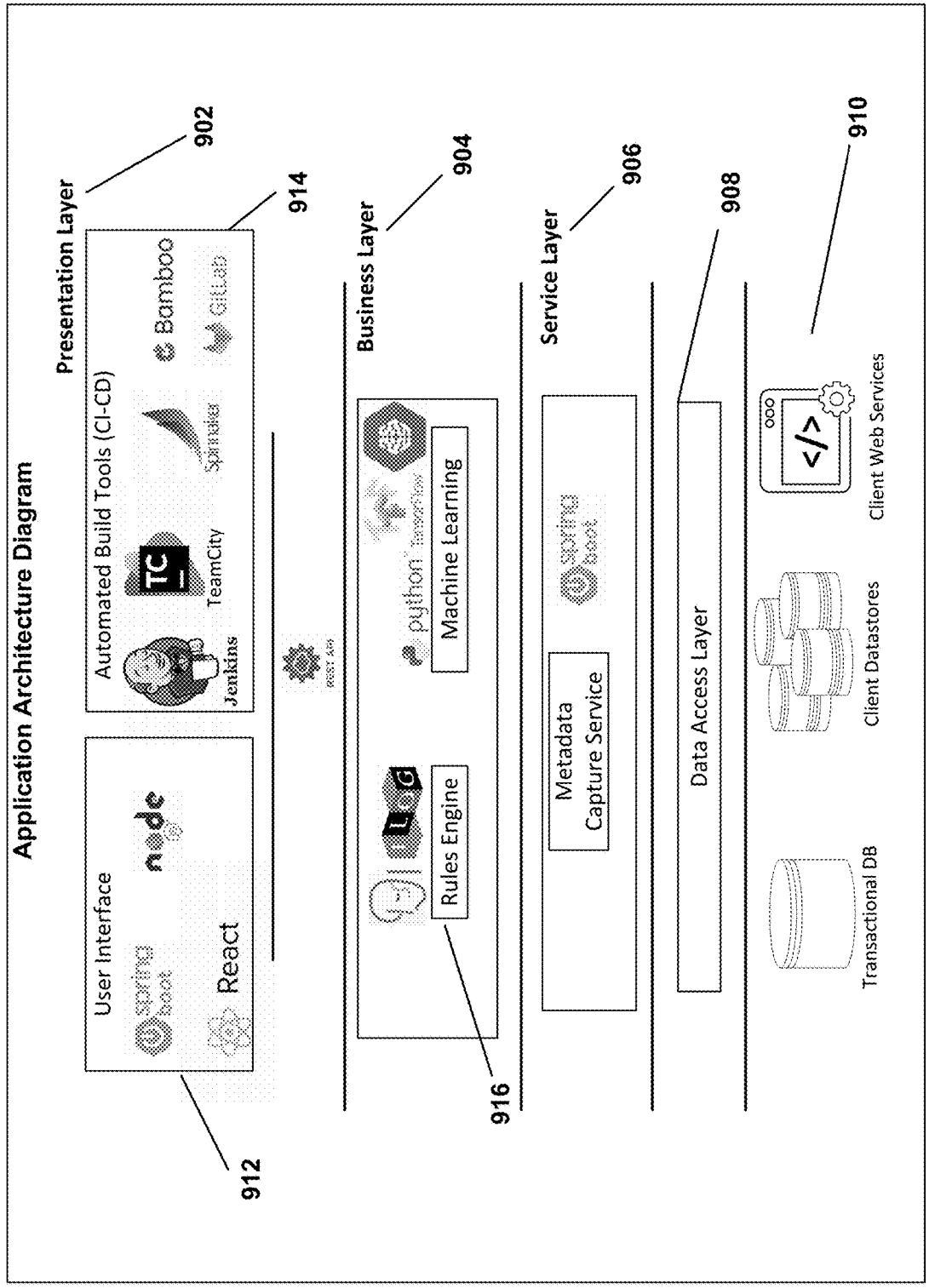
FIG. 9 depicts an application architecture according to exemplary embodiments.

FIG. 9 depicts an application architecture 900 according to exemplary embodiments. The different layers of the application can be seen in the architecture including a presentation layer 902, which includes a user interface 912 and automated tools (CI-CD) 914, a business layer 904, which includes a rules engine 916, a service layer 906, and a data access layer 908, which includes examples of different data stores 910 which may be accessed by the architecture. In exemplary embodiments, these data stores may be primarily internal data sources. In FIG. 9, certain applications and open source software applications are depicted and are meant to be exemplary and non-limiting, as other applications and open source software applications may be used.

Figure 10:
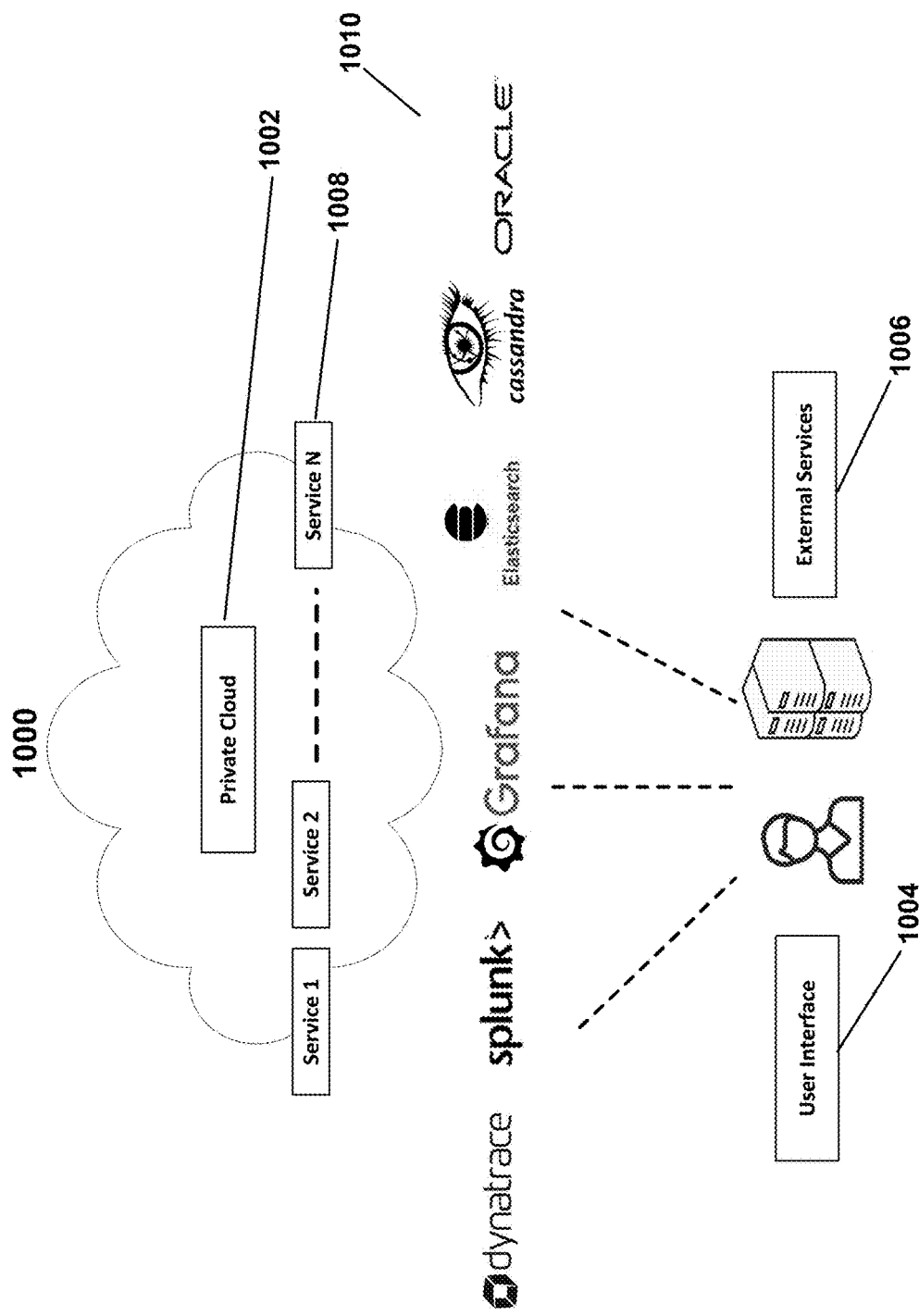
FIG. 10 depicts a private cloud architecture according to exemplary embodiments.

FIG. 10 depicts an exemplary cloud based architecture 1000 that may be deployed on a private cloud container 1002 and be invoked by a web application via user interface 1004 or from any external server 1006 via REST service API call. The private cloud container 1002 may have one or more services 1008 running. The "Toxic Combo Scan" services according to exemplary embodiments are hosted on the private cloud. Exemplary, but non-limiting, private cloud containers are listed in FIG. 10. The cloud based application may use services in 1010 for data storage, application monitoring, logging mechanisms, and to optimize performance.

Figure 11:
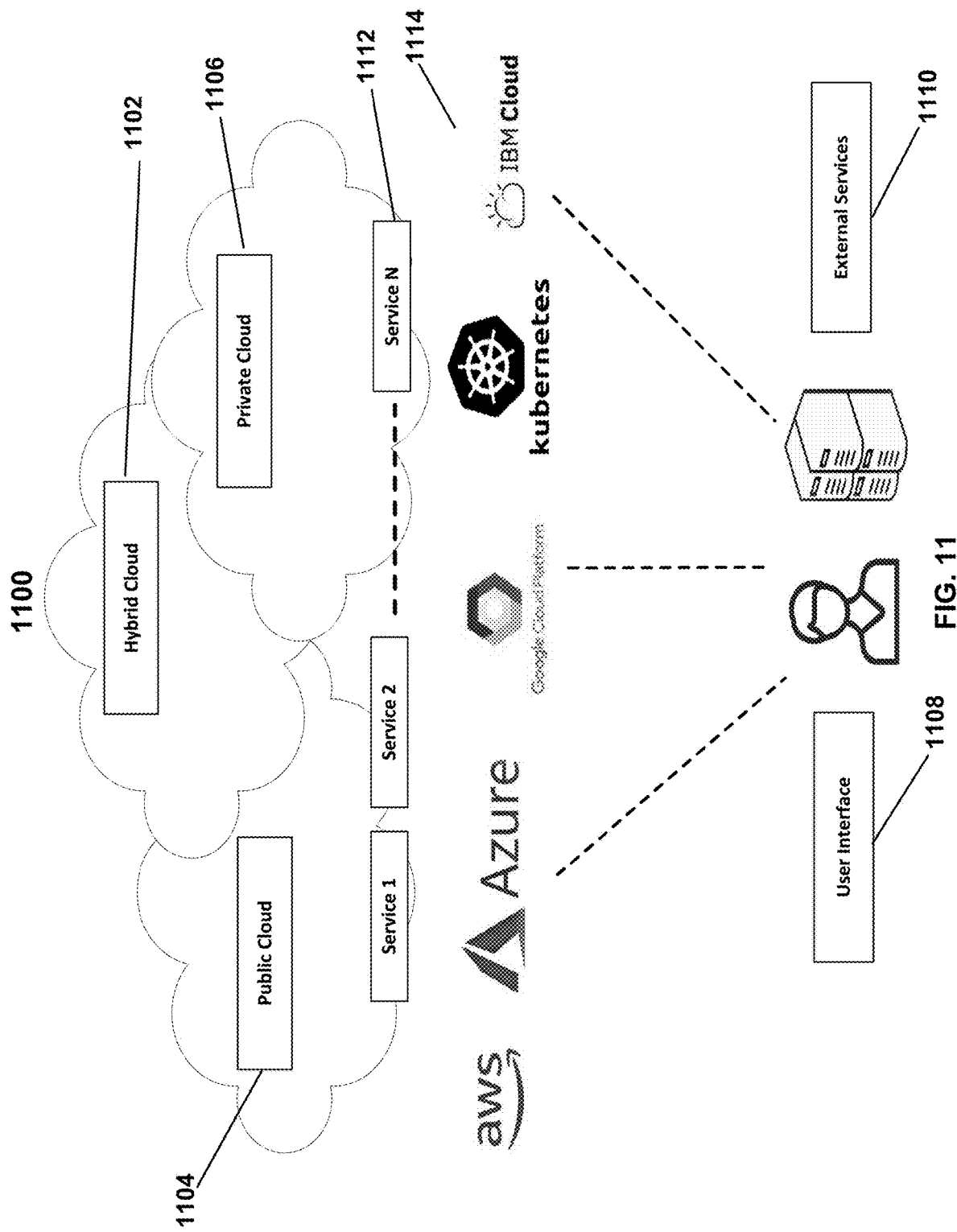
FIG. 11 depicts a cloud architecture according to exemplary embodiments.

FIG. 11 depicts an exemplary cloud based architecture 1100 that may be deployed on any premise server or cloud container (including hybrid cloud 1102, public cloud 1104, and/or private cloud 1106) and be invoked by a web application via user interface 1108 or from any external server 1110 via REST service API call. The "Toxic Combo Scan" services can be hosted on the public, private or hybrid cloud as a target state solution. Exemplary, but non-limiting, premise server and cloud containers 1114 are listed in FIG. 11 that may be potentially used as hosts.

Exemplary embodiments are platform/infrastructure agnostic and can be hosted in a public, private or hybrid cloud as well as physical infrastructure as shown in FIGS. 10 and 11. The "Toxic Combo Scan" service(s) can be invoked via User Interface or Web Service Call in any cloud or physical infrastructure.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

The foregoing examples show the various embodiments in exemplary configurations; however, it should be appreciated that the various components may be configured in a variety of way. Further, it should be appreciated that the components of the various embodiments may be combined into one or more devices, collocated on a particular node of a distributed network, or distributed at various locations in a network, including being geographically separated, for example. As will be appreciated by those skilled in the art, the components of the various embodiments may be arranged at any location or locations within a distributed network without affecting the operation of the respective system.

As described above, the various embodiments of the present invention support a number of devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, application, or software.

It will be readily understood by those persons skilled in the art that the various embodiments are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the various embodiments.

Accordingly, while the various embodiments have been described here in detail in relation to its exemplary embodiments, it is to be understood that this disclosure is only illustrative and exemplary of the various embodiments and is made to provide an enabling disclosure of the various embodiments. Accordingly, the foregoing disclosure is not intended to be construed or to limit the various embodiments or otherwise to exclude any other such embodiments, adaptations, variations, modifications or equivalent arrangements.

Although the embodiments have been described herein in the context of a particular implementation in a particular environment for a particular purpose, those skilled in the art will recognize that its usefulness is not limited thereto and that the embodiments can be beneficially implemented in other related environments for similar purposes.

What is claimed is:

1. A system, comprising:
a server comprising at least one hardware processor configured with a scan tool for scanning an application in at least one of a database and computer code and configured with one or more rulesets, the one or more rulesets being configured to identify toxic combinations of personal information in the at least one of the database and the computer code,
the server providing access to the scan tool upon verification of a login request,
the server being further configured to
present a user interface configured to receive the login request for the scan tool via a computer network, receive a selection of the application to be scanned by the scan tool, and provide actuation of a scan by the scan tool of the application in the at least one of the database and the computer code, or
automatically execute scans of the database and the computer code resident on a network, and
the server further being configured to display results of the scan,
wherein the server performs the scan of the application with the scan tool in response to receiving the login request and the selection from the user interface,
wherein the one or more rulesets are updated periodically,
wherein the server is further configured to present an application dashboard on the user interface, and
wherein the application dashboard comprises a data store component, a distributed data store component, and a Representational State Transfer (REST) service component
wherein the REST service component displays a failed previous scan, indicating the current risk classification does not match the actual risk classification.

2. The system according to claim 1, wherein the results of the scan identify whether at least one toxic combination of personal information is present in the at least one of the database and computer code.

3. The system according to claim 2, wherein one or more fields containing the at least one toxic combination are identified in the results of the scan.

4. The system according to claim 1, wherein the results of the scan identify when an actual risk level does not match an expected risk level.

5. The system according to claim 1, wherein the results of the scan comprise an indication that the scan is incomplete and a request for further information is displayed.

6. The system according to claim 1, wherein the scans are run on computer code that is in development.

7. The system according to claim 1, wherein the scans are performed on computer code at periodic intervals.

8. A method comprising:
performing with the server recited in claim 1 the operations of
providing access to a scan tool for scanning an application in at least one of a database and computer code upon verification of a login request,
scanning the application by
a) presenting a user interface configured to receive the login request for the scan tool via a computer network, receiving a selection of the application to be scanned by the scan tool, and providing actuation of a scan by the scan tool of the application in the at least one of the database and the computer code, or
b) automatically executing a scan of the database and the computer code resident on a network,
identifying toxic combinations of personal information in the at least one of the database and the computer code using results of the scan,
displaying the results of the scan,
periodically updating one or more rulesets of the server, and
presenting an application dashboard on the user interface,
wherein the application dashboard comprises a data store component, a distributed data store component, and a Representational State Transfer (REST) service component, and
wherein the REST service component displays a failed previous scan, indicating the current risk classification does not match the actual risk classification.

9. The method according to claim 8, wherein the results of the scan identify whether at least one toxic combination of personal information is present.

10. The method according to claim 9, wherein one or more fields containing the at least one toxic combination are identified in the results of the scan.

11. The method according to claim 8, wherein the results of the scan identify when an actual risk level does not match an expected risk level.

12. The method according to claim 8, wherein results of scans are depicted for each component.

13. The method according to claim 8, further comprising:
   receiving an input on the application dashboard to submit the results of the scan for further review by another user.

* * * * *